No. 652,988. Patented July 3, 1900.
C. B. WELLS.
BICYCLE CRANK.
(Application filed Sept. 28, 1899.)
(No Model.)
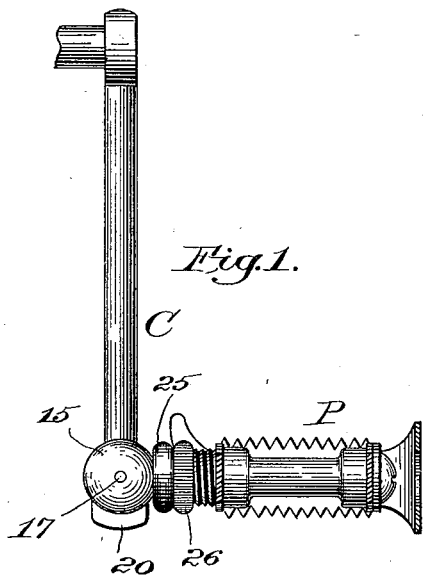
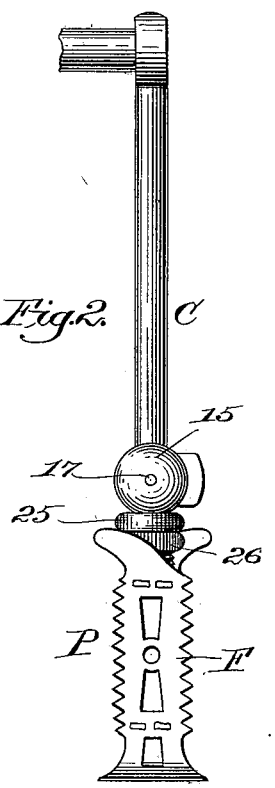
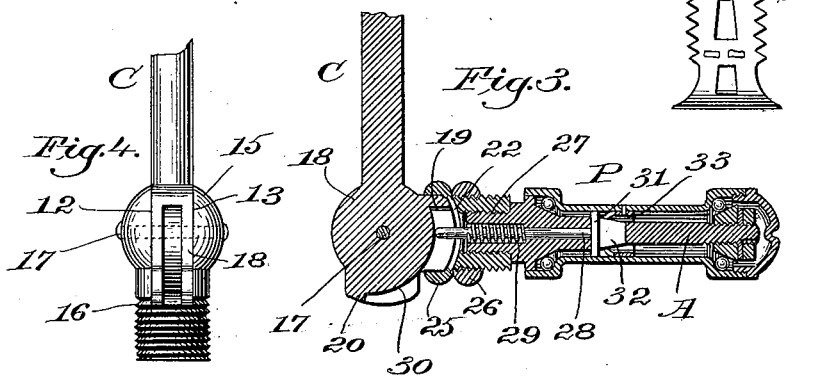
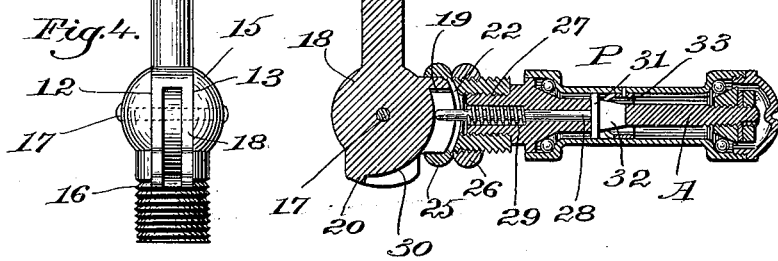
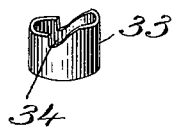
Witnesses:
Thomas J. Drummond
Adolf C. Kaiser
Inventor:
Carl B. Wells,
by Crosby Gregory
Attys.

UNITED STATES PATENT OFFICE.

CARL B. WELLS, OF CHELSEA, MASSACHUSETTS.

BICYCLE-CRANK.

SPECIFICATION forming part of Letters Patent No. 652,988, dated July 3, 1900.

Application filed September 28, 1899. Serial No. 731,903. (No model.)

*To all whom it may concern:*

Be it known that I, CARL B. WELLS, of Chelsea, county of Suffolk, State of Massachusetts, have invented an Improvement in Bicycle-Cranks, of which the following description, in connection with the accompanying drawings, is a specification, like letters and numerals on the drawings representing like parts.

This invention relates to bicycle-cranks; and the object of the invention is to provide an improved device of this character having a pedal shiftably united to the crank and movable out of its normal position angularly with ease and rapidity, so that it can be adjusted in such a manner as not to project laterally or at right angles from the crank, as in such a case as this the pedal cannot catch or strike objects or persons when a wheel provided with the same is carried through a house or pushed along a crowded street.

In the drawings, Figure 1 is a front elevation of a bicycle-crank constructed in accordance with my invention in a simple embodiment thereof and representing the pedal in its normal position. Fig. 2 is a similar view showing the pedal shifted into line with the crank to form a prolongation thereof. Fig. 3 is a longitudinal central section. Fig. 4 is a detail in inside elevation of the crank and a portion of the pedal, and Fig. 5 is a detail in perspective of a locking-bolt controller.

In the drawings the crank is denoted by C and the pedal by P, and these parts may be of any suitable size or material, and while they are of peculiar importance in connection with bicycles it is evident that they may be employed with equal advantage in many other machines where economy of space when the machine is not running is of importance.

The crank at its lower end is slabbed or flattened off upon its opposite sides, as at 12 and 13, respectively, to receive the bifurcated end 15 of the enlarged hub or body 16 of the pedal, the branches of such bifurcated portion being flattened upon their inner faces to bear against and turn upon the opposite flattened faces of the crank.

The pedal is shown shiftably united to the crank, and for this purpose a pivotal joint may be employed, the pin 17 being represented to unite the parts.

The device constituting the subject-matter of the present application involves a crank, a pedal united thereto and shiftable from a normal position to a position at an angle to its normal position, and any suitable means are provided for locking the pedal in these two positions. The most advantageous construction is illustrated, wherein the pedal is shiftable into line with the crank, as indicated in Fig. 2, to form a prolongation of said crank and so as not to project therefrom, and while any kind of joint may be provided to unite the two parts I prefer to employ a pivotal one. The lower flattened end 18 of the crank is provided with the projections 19 and 20, disposed at substantially right angles to each other and adapted to be disposed between the walls of the longitudinal recess 22 between the branches of the bifurcated end of the pedal.

In Fig. 1 the pedal P is shown as occupying a position substantially at right angles to the crank-arm, this being its normal one, and it is locked in such position when the cycle is in use by suitable means. When, however, the pedal is released, it can be shifted down or up, as the case may be, into line with the crank, as represented in Fig. 2, and when thus shifted it will be seen that the pedal occupies a position approximately at right angles to its normal position and, though not essential, will be locked in its secondary or abnormal position.

The part 16 carries a clamping device, (shown as a ring 25.)

In Fig. 3 the projection 19 is shown as being in line with the pedal, the latter occupying a position at right angles to the crank, and the ring it will be seen encircles the projection 19, so as to hold the pedal against angular movement, and to secure the ring in place against sidewise action the nut 26 is shown, it being threaded upon the body portion 16 and adapted to abut against the clamping-ring 25 when the latter is in its working position. When it is desired to adjust the pedal, the nut 26 is unscrewed, so that the clamping-ring 25 can be disengaged from the projection 19 and the pedal swung down. When the pedal is in line with the crank, the ring 25 will be moved over the lower projection 21 to lock the pedal in its adjusted position, and said ring will be held in place by turning the nut 26 back to its original position or until it strikes the clamping-ring.

From the preceding description it will be evident that the device includes a crank and a pedal, one of said parts embracing and turning upon the other, two projections on one of said parts, and a holding device adapted to engage either projection to hold the pedal in its respective shifted positions.

The body portion 16 is internally threaded to receive the externally-threaded projection 27 of the pedal-pin A, said pedal-pin being shouldered at its inner end to abut against the body portion or hub 16. The pedal-pin is provided with the usual skeleton frame, (denoted in a general way by F.)

From the foregoing it will be obvious that my new device involves a crank and a pedal, said pedal being shiftably united to the crank, and means in connection therewith for locking the pedal in two extreme positions.

When the pedal is swung down from its normal to its adjusted position, it is desirable that it should be held against turning movement, as in case it turns it might present one or more sides outward, which would be objectionable in that half its width would extend beyond the face of the crank; but though this function is an important one it is not so essential as the mechanism previously described, for it sometimes may be omitted.

The inner end of the pedal-pin is bored to receive the spring-controlled bolt 28, the spring thereof being denoted by 29, and serving to retract the spring, said bolt being advanced by the cam-face 30 upon the lower rounded end 18 of the pedal-arm. The bolt is provided at its working end with a transverse head 31, guided against sidewise movements in the slot 32 in the pedal-pin, as clearly shown in Fig. 3.

The keeper for the spring-bolt is denoted by 33 and is shown consisting of a cylinder-rod suitably secured to the inside of the pedal-pin sleeve in adjacence to the head or working end 31 of the spring-controlled bolt. Said sleeve or cylinder 33 has a notch 34 to receive said head.

In Fig. 3 the inner end of the spring-controlled bolt 28 is shown as being in contact with the upper end of the cam-surface 30, and it will be assumed that the pedal has been released. As it is swung downward said bolt by traveling against the cam-surface 30 will be forced outward, or what is shown as the right in Fig. 1, and will enter the notch or recess 34 in the cylindrical keeper 30, which is fixed to the pedal-pin sleeve, whereby said sleeve will be held against turning movement. This action, therefore, is simultaneous with the movement of the pedal. When the pedal is returned to its initial position, the bolt will be retracted by the coiled spring 29, which embraces the same.

The invention is not limited to the precise construction previously set forth, for it may be variously modified within the scope of the appended claims.

Having described my invention, what I claim as new, and desire to secure by Letters Patent, is—

1. In a device of the class specified, a crank, a pedal shiftably connected with the crank and having a turning frame, and locking means normally ineffective and automatically set in action upon the shifting movement of the pedal to prevent said frame from turning.

2. In a device of the class specified, a crank, a pedal hinged to the crank and shiftable into line with, to form a prolongation of, said crank, and having a turning frame, and locking means carried by the pedal normally inoperative and automatically set in action upon the shifting movement of and by said pedal, to prevent the frame from turning.

3. In a device of the class specified, a crank, a pedal shiftably connected to the crank, two projections upon the crank, a ring upon the pedal adapted to engage either projection, and a nut upon the pedal located to engage said ring.

4. In a device of the class specified, a crank, a pedal shiftably united to the crank, a spring-actuated locking-bolt, a device carried by the pedal-frame and adapted to be engaged by said bolt when the latter is in its working position, to prevent the pedal-frame from turning on its spindle, and means upon the crank to throw the bolt into working position.

5. In a device of the class specified, a crank, a pedal shiftably united to the crank and having a turning frame, a locking device carried by the pedal, a cam upon the crank for advancing said locking device, means for normally holding the locking device in its ineffective position thereby to permit the frame to turn, and a device upon the pedal-frame adapted to be engaged by said locking device to prevent the frame from turning upon its spindle.

6. In a device of the class specified, a crank-arm, a pedal shiftably united to the crank, and including a pin, a sleeve turning upon said pin, a cylindrical notched keeper within the sleeve, a bolt having a head to enter said notch, a cam upon the crank to advance the bolt, and a spring acting in opposition to said cam.

In testimony whereof I have signed my name to this specification in the presence of two subscribing witnesses.

CARL B. WELLS.

Witnesses:
HEATH SUTHERLAND,
JOHN C. EDWARDS.